June 30, 1925.  1,544,123
P. F. BARTON
TRASH DUMPING WEEDER
Filed Feb. 14, 1923    2 Sheets-Sheet 2

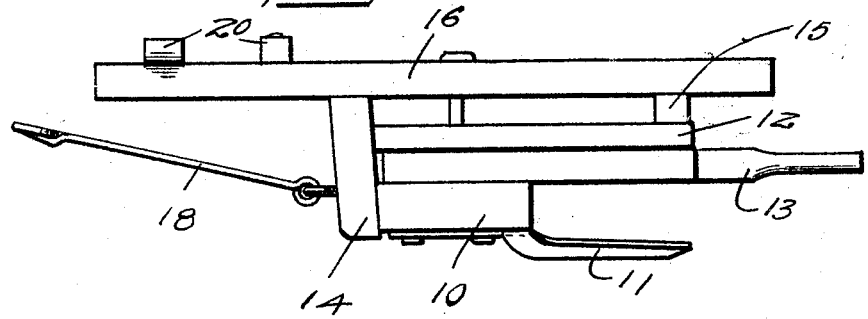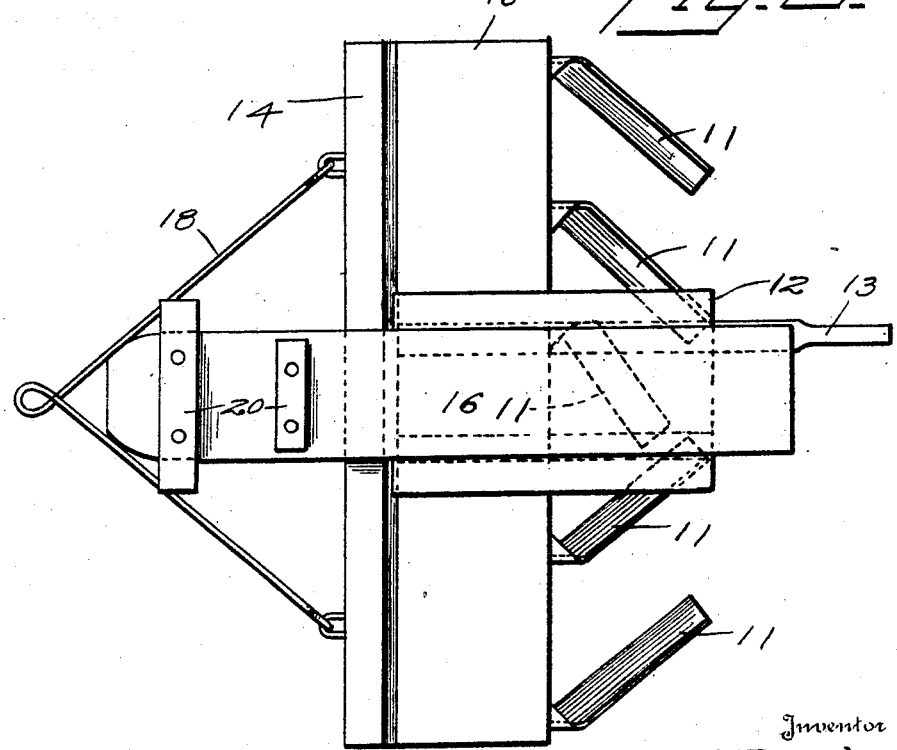

Inventor
P. F. Barton

Patented June 30, 1925.

1,544,123

UNITED STATES PATENT OFFICE.

PERRY F. BARTON, OF ESCALON, CALIFORNIA.

TRASH-DUMPING WEEDER.

Application filed February 14, 1923. Serial No. 619,026.

*To all whom it may concern:*

Be it known that I, PERRY F. BARTON, a citizen of the United States, residing at Escalon, in the county of San Joaquin and State of California, have invented certain new and useful Improvements in Trash-Dumping Weeders; and I do hereby declare the following to be a full, clear, and exact description of the invention, such as will enable others skilled in the art to which it appertains to make and use the same.

The object of the invention is to provide simple and efficient means whereby the accumulation of trash on the blades of an agricultural weeder may readily be disengaged or dumped or detached from the blades to clear the same and permit proper operation thereof without resorting to the conventional method of stopping the team and going to the rear of the machine and manually raising the same in order to effect the desired operation; and more particularly to provide a weeder which can be dumped and relieved of an accumulation of trash without interrupting the forward progress of the device and therefore without loss of time and effort which are usually incidental to the use of an apparatus of this type; and with these objects in view the invention consists in a construction, combination and relation of parts of which a preferred embodiment is illustrated in the accompanying drawings, wherein:

Figure 1 is a side view, and

Figure 2 is a plan view of a weeder equipped with a dumping mechanism embodying the invention.

The weeder proper includes the transverse beam 10 to which are attached the weeder blades 11 which in this instance are arranged obliquely with reference to the path of movement of the machine, a beam 12 being extended rearwardly from the cross beam 10 at the center of the same, and as usual being provided with a handle 13 by which the machine may be tilted to detach trash and weeds from the blades when they have accumulated to such an extent to interfere with the proper cutting of the blades.

Figure 3:
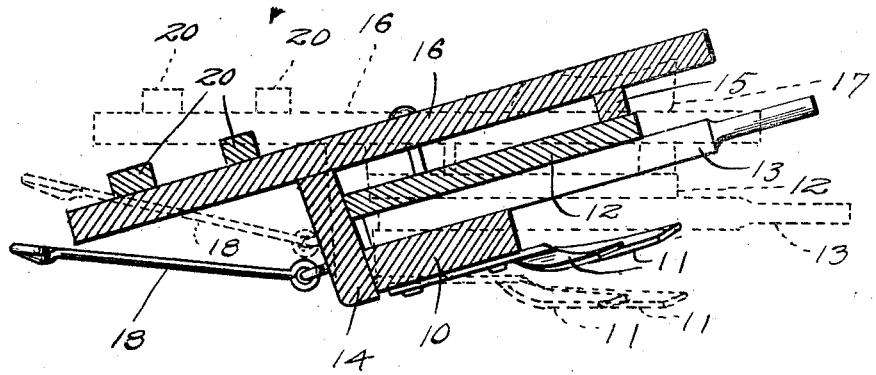
Figure 3 is a sectional view showing the device in full lines in the tilted or dumping position and in dotted lines in the normal or operative position.
Figure 4:
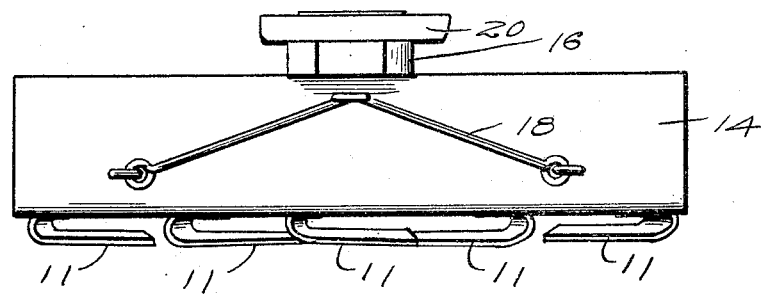
Figure 4 is a front view of the machine.

Secured to the forward edge of the main beam is a riser 14 of which the lower edge which is preferably rounded constitutes a rocker upon which as indicated in Figure 3 the machine may be tilted forwardly to raise blades from the surface of and out of the soil so as to permit the accumulation of weeds and trash to drop therefrom. Also carried by the rearwardly extending beam of the weeder frame is a riser 15 and supported by these two risers is a longitudinal platform 16 near the rear end of which the driver stands so as to hold the blades in proper position to cut the weeds. The draft yoke 18 extends forwardly and may be of any suitable or preferred construction provided the connection thereof with the frame of the machine is such as to permit of the rocking or tilting of the latter when required.

The tilting platform 16 extends forward beyond the front riser and is provided in advance thereof with one or more stops or cleats 20 for engagement by the foot of the operator and as a means of permitting the operator when the tilting of the machine is desired to throw his weight upon the forward end of the tilting platform so as to rock the frame forward to the discharging position indicated in Figure 3 in full lines. Thus while the operation of the weeder and the results attained thereby are as in the ordinary practice, it is only necessary when the operator desires to clear the blades of the accumulation of weeds and trash to lean forward and throw his weight by pressure of one foot on one of the cleats, in order to tip the weeder forward or rock it upon the lower edge of the front riser so as to lift the blades from the soil, without checking or interfering with the forward progress of the weeder and hence without involving delay, loss of time and inconvenience which are ordinarily involved in the use of a machine of this type.

Having thus described the invention, what I claim is:—

A weeder having a riser, said riser at its lower edge constituting a fulcrum, a platform supported on said riser and extending forwardly thereof to enable the weight of an operator on the platform to tilt it, a cross beam at the base of said riser and rearwardly thereof, weeder blades carried by said cross beam and extending a considerable distance rearwardly therefrom and in contact with the ground to materially increase the supporting surface of the weeder, a beam above and spaced from the cross beam and extending rearwardly beyond the same, handle members disposed intermediate the cross beam and second mentioned beam and extending rearwardly thereof, and a riser adjacent the rear end of the second mentioned beam located between the same and platform and in supporting contact with the latter.

In testimony whereof I affix my signature in presence of two witnesses.

PERRY F. BARTON.

Witnesses:
 MARGARET SCHMALING,
 TOM WILSON.